US009369745B1

(12) United States Patent
Pecjak et al.

(10) Patent No.: US 9,369,745 B1
(45) Date of Patent: *Jun. 14, 2016

(54) DEMOGRAPHIC ATTRIBUTION OF HOUSEHOLD VIEWING EVENTS

(71) Applicant: comScore, Inc., Reston, VA (US)

(72) Inventors: Frank Eugene Pecjak, Fairfax, VA (US); Ramzi Joseph Nasr, Falls Church, VA (US); Magid M. Abraham, Great Falls, VA (US)

(73) Assignee: comScore, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/250,799

(22) Filed: Apr. 11, 2014

Related U.S. Application Data

(63) Continuation of application No. 13/669,594, filed on Nov. 6, 2012, now Pat. No. 8,739,197.

(51) Int. Cl.
*H04H 60/33* (2008.01)
*H04N 21/24* (2011.01)
*H04N 21/81* (2011.01)

(52) U.S. Cl.
CPC ......... *H04N 21/2407* (2013.01); *H04N 21/812* (2013.01)

(58) Field of Classification Search
CPC ............ H04N 21/2407; H04N 21/254; H04N 21/258; H04N 21/25866; H04N 21/25883; H04N 21/44204; H04N 21/4508; H04N 21/4532

USPC .................................................. 725/9, 12, 14
See application file for complete search history.

(56) References Cited

U.S. PATENT DOCUMENTS

| | | |
|---|---|---|
| 2003/0067554 A1 | 4/2003 | Klarfeld |
| 2006/0168613 A1 | 7/2006 | Wood |
| 2008/0300965 A1 | 12/2008 | Doe |
| 2011/0067044 A1 | 3/2011 | Albo |
| 2011/0239253 A1 | 9/2011 | West |
| 2012/0030702 A1 | 2/2012 | Joao |
| 2012/0260278 A1 | 10/2012 | Lambert |

OTHER PUBLICATIONS

Office Action issued in U.S. Appl. No. 13/669,594 on Jun. 12, 2013, 14 pages.
Notice of Allowance issued in U.S. Appl. No. 13/669,594 on Jan. 9, 2014, 8 pages.
Office Action issued in U.S. Appl. No. 14/628,106 on Jul. 22, 2015, 22 pages.

*Primary Examiner* — John Schnurr
(74) *Attorney, Agent, or Firm* — Fish & Richardson P.C.

(57) ABSTRACT

Tuning data representing a television viewing event associated with a particular household is accessed. Household member data representing information on individual members of the particular household is accessed. Viewing profile data representing information on individual members of other households regarding viewership by the individual members of the other households is accessed. Fractional viewership values for the individual members of the particular household are determined based on the tuning data, the household member data, and the viewing profile data. Household viewership data is determined based on the fractional viewership values.

21 Claims, 9 Drawing Sheets

DEMOGRAPHIC ATTRIBUTION OF HOUSEHOLD VIEWING EVENTS

CROSS-REFERENCE TO RELATED APPLICATION

This application is a continuation of U.S. application Ser. No. 13/669,594, filed Nov. 6, 2012, the contents of which are hereby incorporated by reference.

BACKGROUND

Television advertising relies on program and network viewership data in order to determine the expected reach of advertising slots. Advertisers are interested in numbers of viewers as well as the demographics of viewers in order to effectively manage television advertising timing and content. Understanding television audience viewing and habits may be useful in supporting advertising planning, buying, and selling.

SUMMARY

In one aspect, tuning data representing a television viewing event associated with a particular household is accessed. Household member data representing information on individual members of the particular household is accessed. Viewing profile data representing information on individual members of other households regarding viewership by the individual members of the other households is accessed. Fractional viewership values for the individual members of the particular household are determined based on the tuning data, the household member data, and the viewing profile data. Household viewership data is determined based on the fractional viewership values.

Implementations may include one or more of the following features. Determining the fractional viewership value for each individual member may include determining a probability for each individual member having watched the television viewing event based on the household member data and the viewing profile data; determining a household adjustment factor representing the probability that at least one member of the household watched the television viewing event, based on the probabilities for each member having watched the television viewing event; adjusting the probability for each individual member having watched the television viewing event based on the household adjustment factor; and determining the fractional viewership value for each individual member based on the adjusted probability for that member having watched the television viewing event. The viewing profile data may based on survey data.

Determining fractional viewership values for the individual members of the particular household may include, for at least one of the individual members, determining a particular episode of a television program associated with the television viewing event; and determining a fraction of members of other households with information matching the individual member that watch the television program. The household member data may not include information on at least one missing member of the particular household. A fractional viewership value may be determined for the at least one missing member based on determining a fraction of identified members of other households that watch the television program. The members may be identified based on the other members in their households having information matching the information of the members of the particular household other than the at least one missing member.

The household viewership data may be accessed. Other household viewership data for one or more other television viewing events associated with the particular episode of the television program may be accessed. The household viewership data and the other household viewership data may be aggregated to generate episode viewership data associated with the particular episode of the television program. The episode viewership data associated with the particular episode of the television program may be accessed. Other episode viewership data for one or more other episodes of the television program may be accessed. The episode viewership data and the other episode viewership data may be aggregated to generate program viewership data associated with the television program.

The program viewership data may be accessed, wherein the television program may be associated with a particular television network. Other program viewership data for one or more other television programs each associated with the television network may be accessed. The program viewership data and the other program viewership data may be aggregated to generate network viewership data associated with the television network. The network viewership data may be accessed, wherein the television network may be associated with a particular entity. Other network viewership data for one or more other television network each associated with the entity may be accessed. The network viewership data and the other network viewership data may be aggregated to generate entity viewership data associated with the entity.

The tuning data may include a time, date, and television network for the television viewing event. Determining fractional viewership values for the individual members of the particular household may include, for at least one of the individual members, determining a fraction of members of other households with information matching the individual member that watch the television network at the time and date associated with the television viewing event.

The household member data may include, for each of the individual members, one or more demographic groups to which that member belongs. Tuning data representing a second television viewing event associated with the particular household and a particular episode of a second television program may be accessed, the second television viewing event occurring simultaneously with the television viewing event. Second program viewership data may be accessed representing information on individual members of other households regarding viewership of the second television program by the individual members of the other households. Determining fractional viewership values for the individual members of the particular household may be further based on the second program viewership data.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

In general, a system for measuring audience demographics may have information indicating that a television viewing event occurred at a household and may have the demographics for the members of that household, but there may not be any direct indication of which members of the household participated in the viewing event. By using the known demographics of other individuals viewing the same program, a fractional value (for example, between 0 and 1) can be assigned to, for example, each household member representing a probability for that household member having watched the program. These fractional viewership values can be aggregated for one or more of the demographic groups in order to generate demographic viewership data for the episode, program, or network.

By allowing for the demographic attribution of fractional viewership values, a large quantity of tuning data from set top boxes can be used to measure viewership demographics even in the absence of direct data as to which household members are associated with each tuning event.

Figure 1:
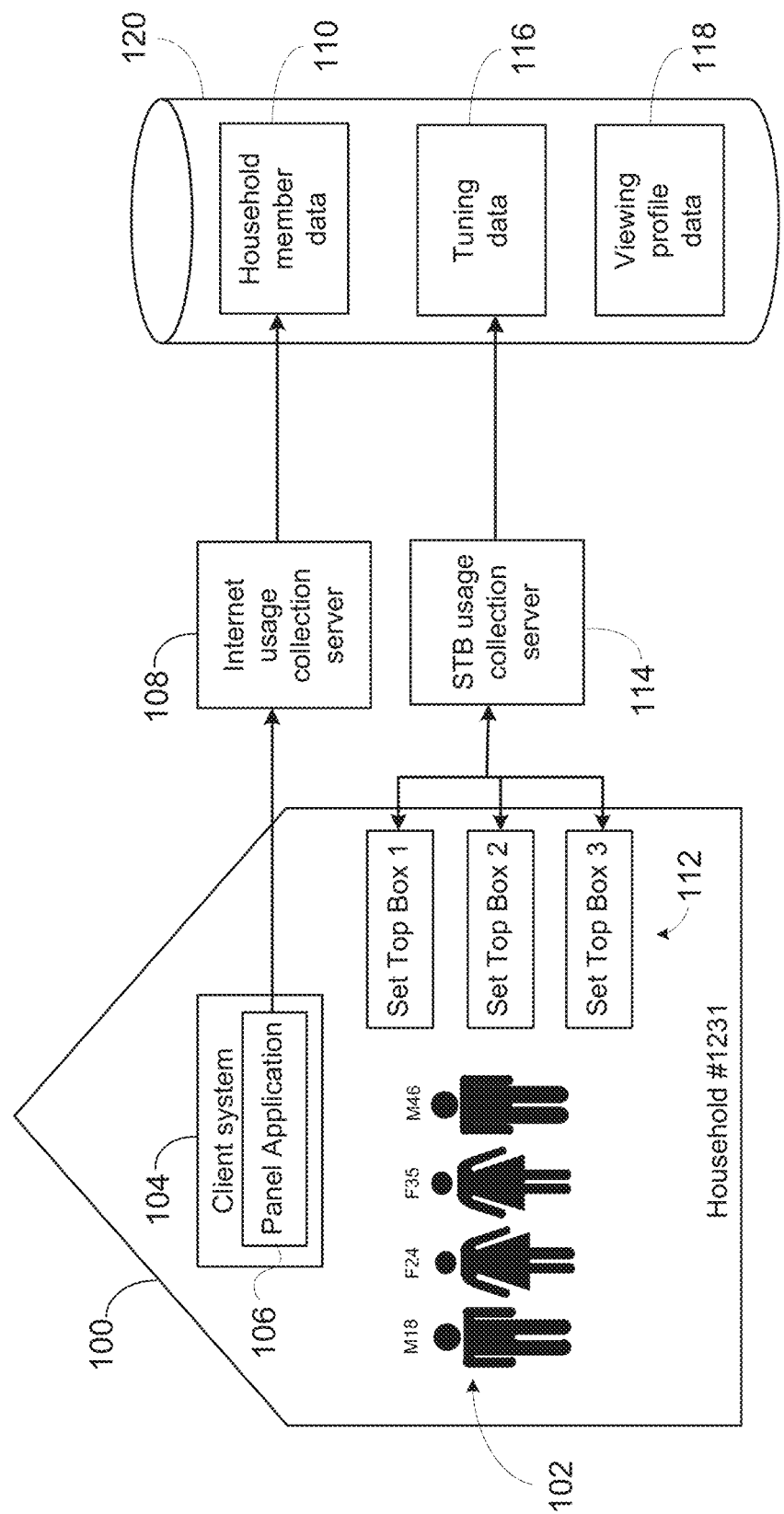
FIG. 1 illustrates a system in which television viewership information may be collected and processed to determine audience measurement data.

FIG. 1 illustrates a system in which television tuning data and demographics information may be collected and processed to determine television viewership data. The system includes a number of households, such as household 100, that include one or more set-top boxes 112 for viewing television programs. The set top boxes 112 record data for tuning events, which may represent a particular television network or program being watched at a particular time. The set top boxes 112 may report these tuning events to a set top box usage collection server 114, which may store tuning data 116 representing these tuning events in a database or other storage 120. In addition to tuning events, the tuning data 116 may include data to identify the household 100 and set top box 112, stream control data, data representing content recorded by the set top box 112, programs ordered on the set top box 112, and data about when the set top box 112 was on or off. Other data about the status of the set top box 112 and user interaction with the set top box 112 may also be recorded and included in tuning data 116.

The households 100 include one or more members 102 that use the set-top boxes to watch television. These members 102 may be associated with demographics, such as age and gender, and these demographics may be collected and stored in storage 120 or another storage as household member data. In the example shown, the household 100 includes four members 102: an 18-year-old male, a 24-year-old female, a 35-year-old female, and a 46-year-old male. Their specific age and gender may be stored may be in household data 120, or the members may instead be associated with demographic groups. For example, each member 102 may be associated with an age group (for example: 18-24, 25-34, 35-44, 45-54, 55-64, or 65+), rather than specific age. Other demographics may be collected, such as occupation, income, or ethnicity.

The demographic information for the household members 102 may be collected in a number of ways. For example, the household 100 may be recruited to be part of a television viewing panel that is used to determine television viewership data. Once the household is recruited, the demographic information may be collected as part of a registration process.

In another example, the household may be a part of, or recruited into, an Internet usage panel that is used to determine Internet usage. Demographic information of the household members 102 may be collected when the household 100 is registered to be part of the Internet usage panel. As part of the Internet usage panel, the household may have a panel application 106 installed on one or more client systems 104 in the household. The panel application 106 may collect internet usage data to send to an internet usage collection server 108. In some implementations, the internet usage data could be used to infer information about household member 102, such as by comparing internet content accessed by each member 102 with demographic or other information about users accessing the same content. Other methods may be used to capture or confirm information about members 102 of the household 100, such as survey data or data captured from other household behaviors, or data provided by third party services that attempt to determine demographic data of household members.

In addition to household member data 110 and tuning data 116, viewing profile data 118 may be stored in storage 120 or otherwise available. The viewing profile data 118 includes information that describes what the demographic viewing audience history is for certain TV programs. For example, the viewing profile data 118 may indicate what percentage of the people that are within a particular demographic group viewed a certain program (e.g., 6% of all males between the ages of 18 and 24 watched the show X). The viewing profile data 118 may represent a reasonable approximation of viewership for different demographic groups, and may include a sample of households with varying demographic information. In some implementations, the viewing profile data 118 may be television survey data acquired by a third party provider or by data acquisition systems other than those included in the system shown in FIG. 1.

When reporting tuning events, the set top boxes 112 may not be able to directly report the particular household member or members 102 associated with each tuning event. For example, in some implementations, the tuning data 116 may include episode viewership for the household 100, but may not include a breakdown of the viewership of individual members of the household 102. As described further below, the household member data 110, tuning data 116, and viewing profile data 118 may be used to determine, for a given program, values for members 102 of the household 100 that represent the probability that the corresponding member 102 watched the program. These values can be aggregated for various demographic groups in order to generate demographic viewership data for the episode, program, or network.

Figure 2:
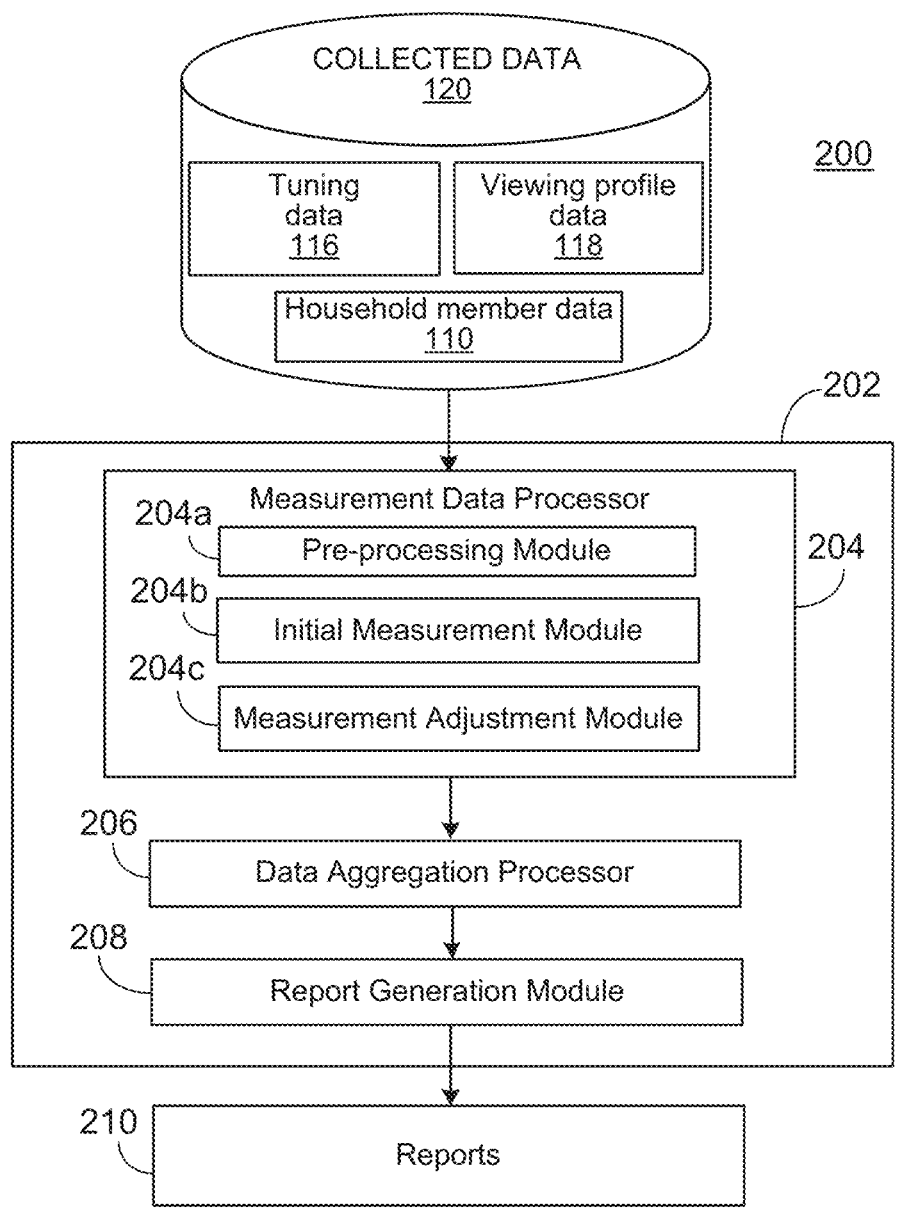
FIG. 2 illustrates an example of a system in which collected data can be used to generate viewership data through demographic attribution.

FIG. 2 illustrates an example of a system 200 in which collected data can be used to generate viewership data through demographic attribution. The system 200 includes a reporting server 202. The reporting server 202 may be implemented using, for example, a general-purpose computer capable of responding to and executing instructions in a defined manner, a personal computer, a special-purpose computer, a workstation, a server, or a mobile device. The reporting server 202 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the reporting server 202.

The reporting server 202 executes instructions that implement a measurement data processor 204, a data aggregation processor 206, and a report generation module 208. The measurement data processor 204 includes a pre-processing module 204a, an initial measurement module 204b, and a measurement adjustment module 204c. The measurement data processor 204 and report generation module 208 may implement a process, such as that shown in FIG. 3, to generate viewership data based on the household member data 110, tuning data, 116, and viewing profile data 118 and use that data to generate one or more reports 210 that include information regarding episode-level, program-level, network-level, or entity-level viewership.

Figure 3:
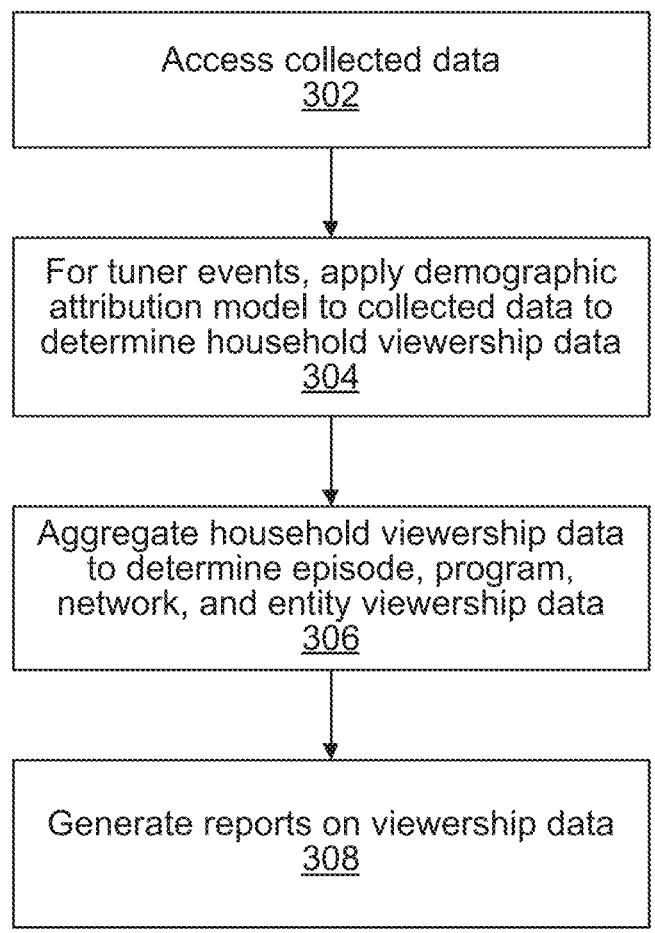
FIG. 3 is a flow chart illustrating an example of a process for generating viewership data and using that data to generate viewership reports.

FIG. 3 is a flow chart illustrating an example of a process 300 for generating viewership data and using that data to generate viewership reports. The following describes the process 300 as being performed by components of the reporting server 202 with respect to data associated with the household 100. However, the process 300 may be performed by other systems or system configurations and implemented with respect to other members of the viewing audience.

The pre-processing module 204a accesses the collected data 120, including household member data 110, tuning data 116, and viewing profile data 118 (302). The pre-processing module 204a may perform one or more pre-processing functions on the household member data 110, tuning data 116, and viewing profile data 118 as appropriate. For example, the pre-processing module 204a may sort the household member data 110 into particular demographic categories for demographic attribution. The pre-processing module 204a may identify the particular program associated with a tuning event within the tuning data 116 and may extract particular demographic data from the viewing profile data 118, such as the profile data for the particular program associated with the tuning event within each of the demographic categories represented by the household members 112.

Once the appropriate data is extracted, the measurement data processor 204 applies a demographic attribution model to the data in order to determine household viewership data for the household 100 (304). The household viewership data may be in the form of one or more values that, for a given household member, represent the probability that the household member viewed the program episode associated with the tuning event. For example, a fractional value may be determined for each household member, or for each of a subset of the household members, and represents the probability that the corresponding member viewed the program episode associated with the tuning event. These fractional values may be assigned according to processes 400 or 500 described below.

The data aggregation processor 206 aggregates the household viewership data from the household 100 with further household viewership data accumulated from other households in order to generate various levels of viewership data (306). For example, the various sets of household viewership data may be aggregated to determine episode viewership data for the episode corresponding to the tuning event. The episode viewership data may itself be broken down into a number of demographics or other group measurements based on what is relevant to the television entity or to advertisers.

The data aggregation processor 206 may further aggregate the episode viewership data for multiple episodes into program viewership data reflecting the viewership demographics for the program as a whole. Program viewership data may be further aggregated from multiple programs appearing on the same network in order to determine network viewership data. If two or more networks are owned by the same entity, the network viewership data may be further aggregated into entity viewership data. At each level, the data may continue to isolate and report on various demographics or may aggregate one or more of the demographic dimensions.

The report generation module 208 generates viewership reports 210 based on the aggregated viewership data (308). These reports may include data at any level of aggregation, and may be specified by a user. Reports may include the viewership data of various demographic groups as estimated through the use of demographic attribution. Entities may request particular demographic data and data at a particular level of aggregation.

For example, a program-level report may show that a particular program has been watched by 12% of males ages 18-24. A network-level report may show that 45% of viewers of a particular network are females above age 40. An entity-level report may show that 57% of males and 25% of females watched at least one of the entity's sports networks during the time period representing this year's regular baseball season.

Figure 4:
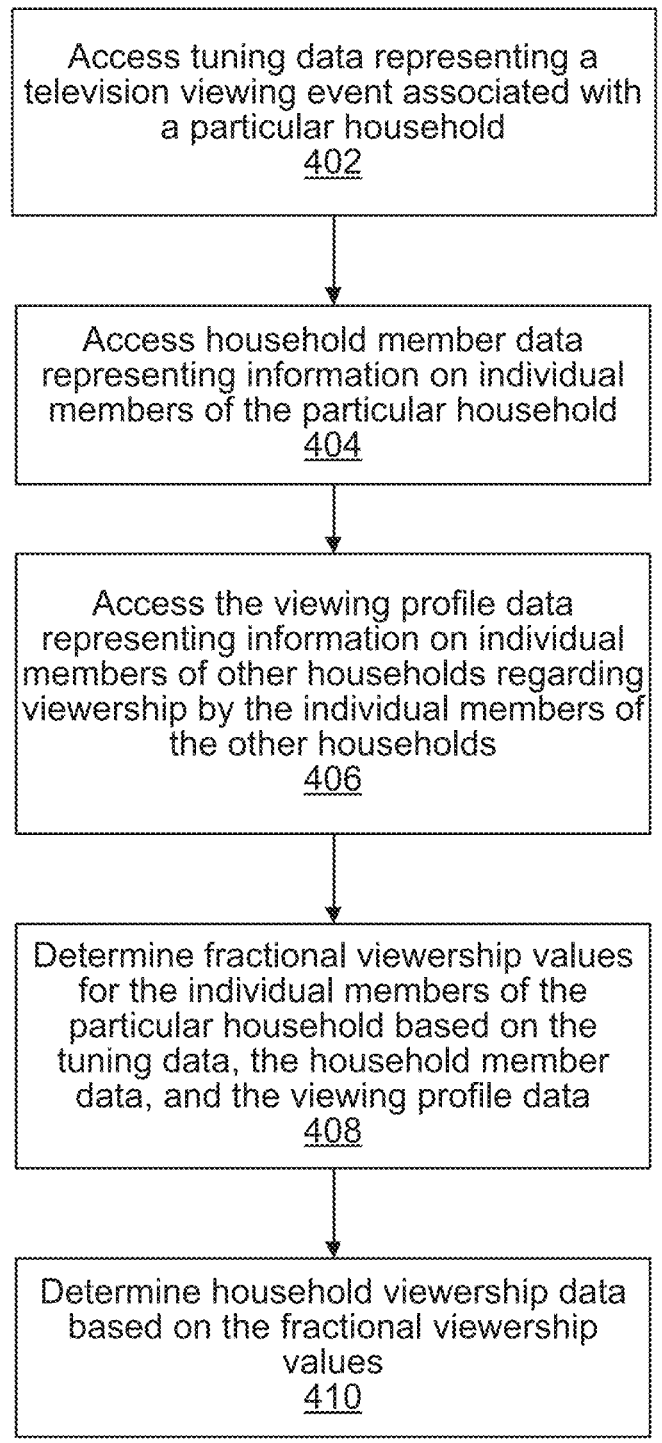
FIG. 4 is a flowchart illustrating an example of a process for determining event viewership data for a particular television viewing event.

FIG. 4 is a flowchart illustrating an example of a process 400 for determining event viewership data for a particular television viewing event. The following describes the process 400 as being performed by components of the measurement data processor 204 with respect to data associated with the household 100. However, the process 400 may be performed by other systems or system configurations and implemented with respect to other members of the viewing audience.

The pre-processing module 204a accesses tuning data representing a television viewing event associated with a particular household (402). The pre-processing module may extract the tuning event data for the television viewing event from a larger collection of tuning data 116 involving multiple tuning events. In some implementations, other relevant tuning events may also be extracted (such as simultaneous events as further described with respect to process 800 described below).

In some implementations, the television viewing event may be associated with a particular episode of a television program. In some implementations, the television viewing event may not be associated with a particular program but may be associated with tuning data 116 such as a date, time, and television network.

The pre-processing module 204a accesses the household member data 110 representing information on individual members of the particular household 100 (404). The pre-processing module 204a may identify particular elements of this data for use in comparison with members of other households, such as age category, gender, race, and occupation. Information about the household as a whole, such as household size or income, may also be identified for use. Each household member 110 may be identified by one or more demographic dimensions relevant to the particular application of the demographic attribution model.

The pre-processing module 204a accesses the viewing profile data 118 representing information on individual members of other households regarding viewership by the individual members of the other households (406). The pre-processing module 204a may extract the viewing profile data 118 for demographic groups matching the individual members of the household 100 and demographic groups from households that match the household 100 as a whole. For the example of the household 100 as shown in FIG. 1, the pre-processing module 204a may extract the viewership data for 18-year-old males in households with four people, 24-year-old females in households with four people, 35-year-old females in households with four people, and 46-year-old males in households with four people.

The viewing profile data 118 may be for the viewership of television viewing events sharing one or more characteristics with the television viewing event represented by the tuning data 116. For example, where the tuning data 116 represents a television viewing event represented by a particular episode of a television program, the viewing profile data 118 may be for the viewership of the television program by members in other households. If the television viewing event is represented by a date, time, and network, the viewing profile data 118 may be for the viewership of the network at the date and time by members in other households.

The initial measurement module 204b and the measurement adjustment module 204c determine fractional viewership values for the individual members of the particular household based on the household member data and the viewing profile data (406). The fractional viewership values for a given member of the household represents the probability that member viewed the particular event. The set of fractional viewership values for a given household may represent household viewership data. The fractional viewership values may be determined, for example, using process 500.

The measurement data processor 204 determines household viewership data based on the fractional viewership values (410). The household viewership data associates the fractional viewership values with demographics of the individual members of the particular household. For example, a fractional viewership value may be determined for each member of the household, and then associated with that member's demographics.

Figure 5:
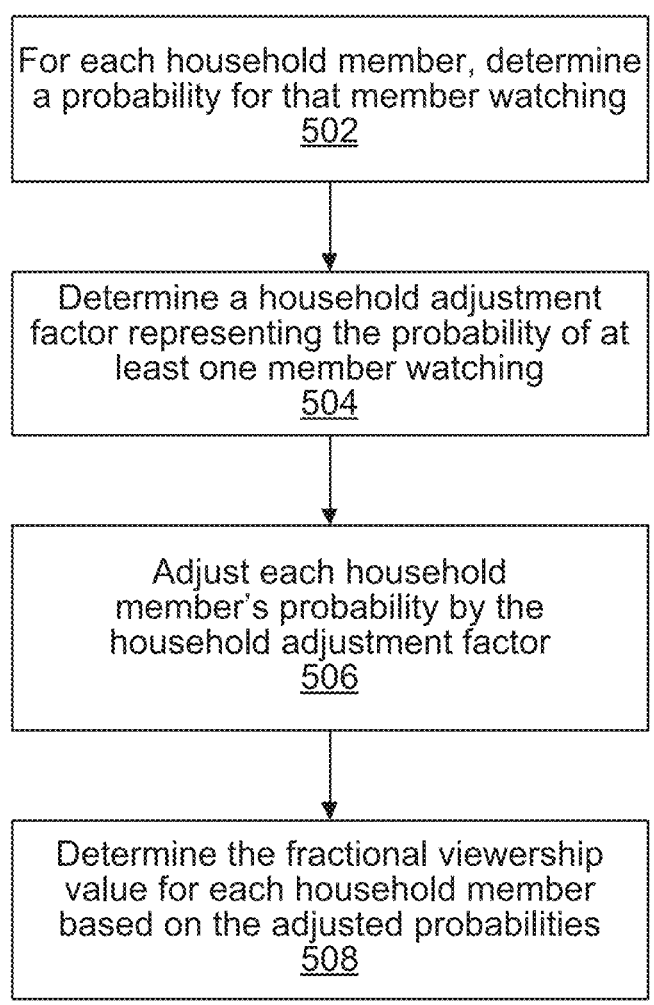
FIG. 5 is a flowchart illustrating an example of a process for generating fractional viewership values for individual household members for a particular television viewing event.

FIG. 5 is a flowchart illustrating an example of a process 500 for generating fractional viewership values for individual household members for a particular television viewing event. The following describes the process 500 as being performed by components of the measurement data processor 204 with respect to data associated with the household 100. However, the process 500 may be performed by other systems or system configurations and implemented with respect to other members of the viewing audience. As described, the process 500 assumes that the tuning data 116 is associated with a known television program and that the viewer profile data 118 includes viewership of the program, although a similar process may be performed in situations where data about the television program is not available.

For each individual member 102 of the household 100, the initial measurement module 204b determines a probability for that member watching the particular event (502). The probability may, for example, be determined based on the viewing profile data 118 and may represent the fraction of the demographic group matching each member's demographic group that has been recorded to watch the program associated with the television viewing event.

More formally, the probability of a member i of household h with demographic characteristics $d_i$ can be written as $P(V_i^s | d_i, H)$ where $V_i^s$ denotes that person i views a particular episode s, and H is the number of members in the household h. Then the probability for the member i watching the show s can be computed as:

$$P(V_i^s | d_i, H) = \frac{n_{d_i, H}}{N_{d_i, H}}$$

Where $n_{d_i, H}$ is the number of persons with demographic characteristics $d_i$ and household size H within the viewing profile data 118 who are recorded as watching a particular episode of the program, and $N_{d_i, H}$ is the total number individuals with demographic characteristics $d_i$ and household size H within the profile viewing data 118.

Where $B_h^s$ is the occurrence of a television tuning event representing the episode s within the household h, and $D_h$ is the household member data 110 for all members of the household h, the following probabilities are considered to be equivalent:

$$P(V_i^s | d_i, H) = P(V_i^s, B_h^s | d_i, H) = P(V_i^s, B_h^s | D_h)$$

That is to say, given household member i's demographics and household size, the probability of i watching the episode s is equal to the probability of i watching the episode s and the episode s being associated with a tuning event in the household h. In fact, this should generally be true, for any time that $V_i^s$ is true, $B_h^s$ should also be true (that is, any time household member i watched the episode s, there should be a tuning event in household h for episode s) and so $P(V_i^s) = P(V_i^s, B_h^s)$ generally. Furthermore, in some implementations, the probability of household member i watching the episode s and the episode s being associated with a tuning event in the household h given i's demographics and household size is equal to the probability of household member i watching the episode s and the episode s being associated with a tuning event in the household h given the household member data 110 for the whole household h—that is, it can be assumed that the particular individual demographic data of the other members of the household h does not affect the probability that i watches s.

The measurement adjustment module 204c determines a household adjustment factor representing the probability that at least one member is watching the program (504). This may represent, for example, the probability that, given the individual household members' probabilities of watching the program, at least one household member watches the program, assuming independent probabilities for each of the household members.

Formally, the probability of a tuning event occurring in household h with demographics $D_h$ may be calculated according to the equation:

$$P(B_h^s | D_h) = 1 - \prod_i [1 - P(V_i^s, B_h^s | D_h)] \; \forall \, i \in h$$

The household adjustment factor may be determined in other ways. For example, in some implementations, the household adjustment factor may represent the fraction of households with the same demographic composition as the particular household 100 that watch the program according to the viewership data 118, as expressed in the following equation:

$$P(B_h^s | D_h) = \frac{n_{D_H}}{N_{D_H}}$$

Other household adjustment factors may be used based on other known methods for estimating $P(B_h^s|D_h)$ based on known data.

The measurement adjustment module 204c adjusts each household member's probability by the household adjustment factor (506). In some implementations, this may involve dividing the member's probability by the household adjustment factor. If the household adjustment factor represents the probability of at least one person in the household 100 viewing the program, this adjusted probability represents the Bayesian probability that the particular household member watched the episode given that at least one household member watched. Formally, the equation can be written as:

$$P_{i,D_h}^s = P(V_i^s | B_h^s, D_h) = \frac{P(V_i^s, B_h^s | D_h)}{P(B_h^s | D_h)}$$

In this equation, $p^s_{i,Dh}$ is defined as $P(V_i^s|B_h^s,D_h)$, the probability of a household member i watching a particular episode of a program given the household member data 110 for that household h and that a tuning event associated with s is recorded for the household h.

The adjusted probabilities represent fractional viewership; that is, each individual household member is counted as a fraction of one audience member watching the event based on the adjusted probability that the particular individual household member watched.

The measurement data processor 204 determines the fractional viewership values for each household member based on the adjusted probabilities (508). The fractional viewership values may include additional adjustments or modifications to incorporate other data. For example, the tuning data 116 may indicate that a television viewing event only includes a portion of the duration of an episode. The tuning data 116 may also indicate that an episode was recorded for later playback, that an episode was associated with an alert event set by a household member, that one or more channel-changes occurred during the episode, or some other behavior reported by a set top box that could be used to influence the fractional viewership value of a household member.

Figure 6:
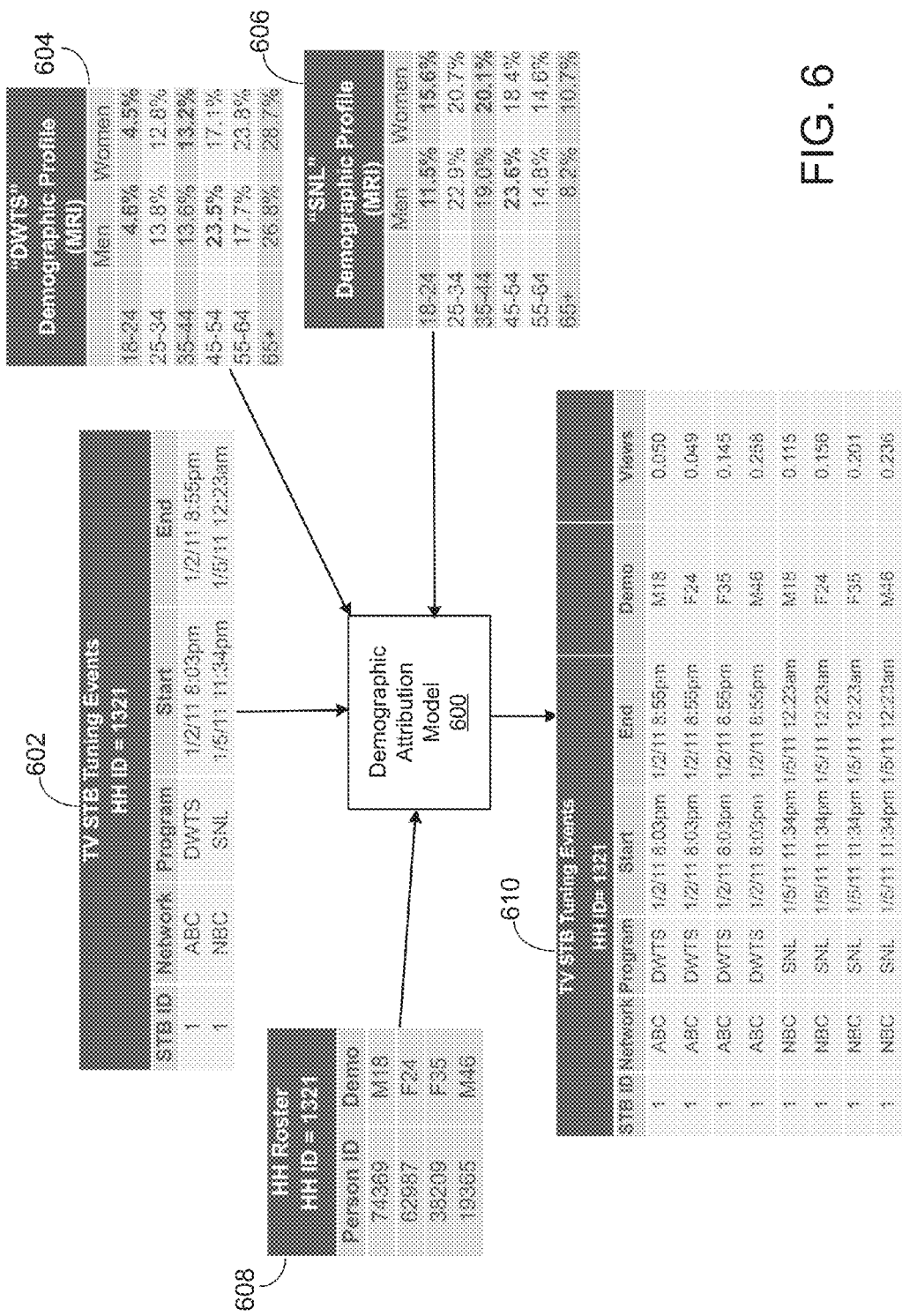
FIG. 6 is a block diagram applying a demographic attribution model to examples of collected data.

FIG. 6 is a block diagram applying a demographic attribution model 600 to examples of collected data. As shown in a tuning events table 602, a television viewing event occurred on January 2 associated with the show "DWTS" on the network "ABC." Another tuning event occurred on January 5 associated with the show "SNL" on the network NBC. The table 604 shows a survey representing the percentage of respondents in each demographic group that watch "DWTS," and the table 606 shows the same survey data for "SNL."

In some implementations, the probability for each individual member watching can be assigned by the initial measurement module 204b to be equal to the percentage watching the program within the member's demographic group. Using tables 604 and 606 for "DWTS" and "SNL" respectively, and using the table 608 representing the household member's demographic data, the initial probabilities may be 4.6% and 11.5% for the M18 member, 4.5% and 15.6% for the F24 member, 13.2% and 20.1% for the F35 member, and 23.5% and 23.6% for the M46 member.

As shown in the table 608 the household used in this example has four members. Using the equations described above with respect to the process 500, for assigned probabilities of $p_1$ through $p_4$ for the four household members, this equation may be equal to:

adjustment factor=$1-(1-p_1)*(1-p_2)*(1-p_3)*(1-p_4)$

For example, the adjustment factor for "DWTS" using the above equation is 39.5%, and the adjustment factor for "SNL" is 54.4%. In some implementations, adjusting the individual probabilities involve dividing the probability of each member i by the household adjustment factor, as follows:

$p^{i\prime}=p_i$/(adjustment factor)

The adjusted probabilities $p_i'$ for each member i may each be adjusted by other factors. In some implementations, the duration of the tuning event may be used to modify each event as follows:

fractional viewership value=$p_i'*$(duration of tuning event)/(duration of episode)

The values shown in the table 610 represent the adjusted probabilities modified by the duration of the tuning event (52 out of 120 minutes for "DWTS" and 49 out of 90 minutes for "SNL"). In some implementations, other adjustments may be made to these values.

Figure 7:
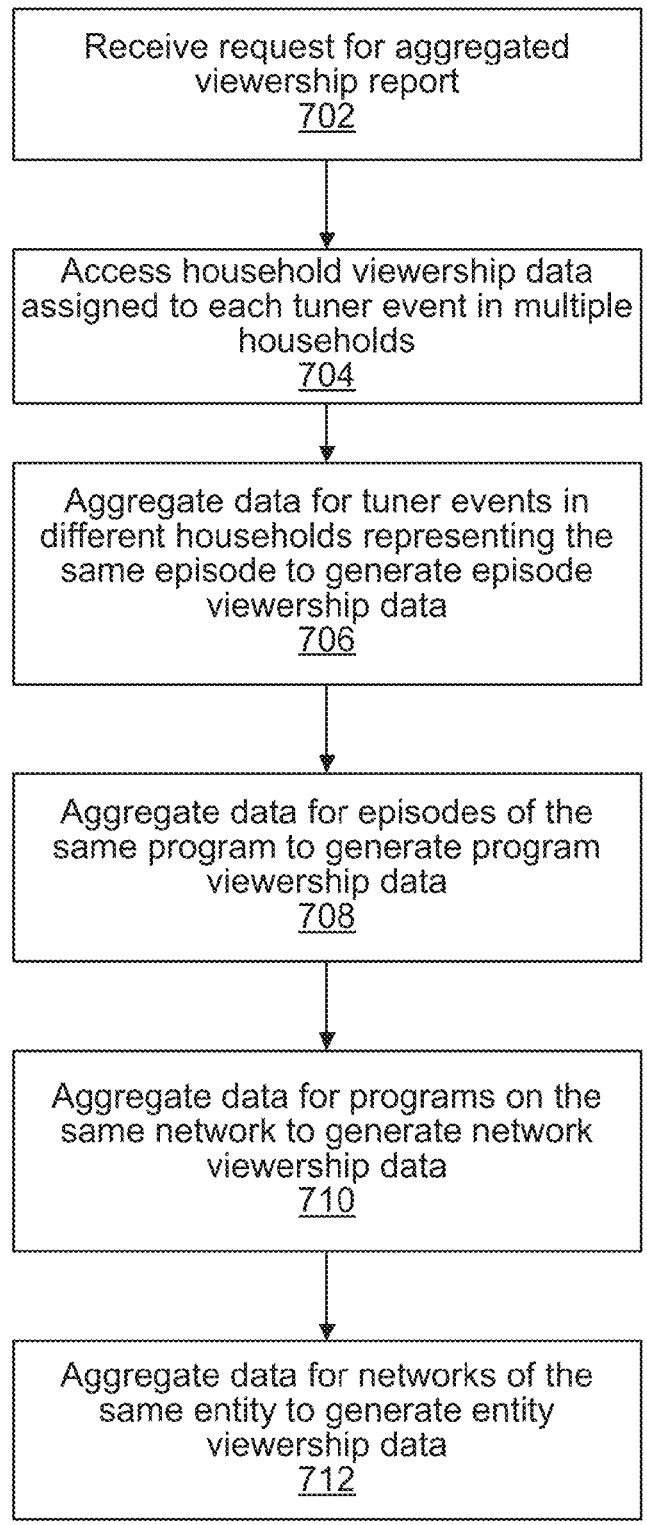
FIG. 7 is a flowchart illustrating an example of a process for aggregating viewership data.

FIG. 7 is a flowchart illustrating an example of a process 700 for aggregating viewership data. The exemplary process 700 is taken as a response for an aggregated report (702), but it will be recognized that the system 200 may aggregate viewership data under other circumstances, such as automatically at an interval or when the data is needed to perform particular analytic functions.

The data aggregation processor 206 accesses household viewership data assigned to each tuning event in multiple households (704). This data may be in the form of fractional viewership values described above with respect to the processes 400 and 500.

The data aggregation processor 206 aggregates the data for the tuning events in different households representing the same episode (706). This produces episode viewership data. In some implementations, aggregating the viewership data involves summing the fractional viewership data in each demographic category and dividing by the number of individuals in that category to arrive at a probability profile for the episode.

In some implementations, an equation for the number of people $N_s$ who viewed the episode s can be calculated as:

$$N^s = \sum_k p_{k,D_h}^s \forall k \in \text{Sample}$$

That is, the sum of the adjusted fractional viewership values over the sample is equal to the estimated number of people from the sample who watched the episode s. As described above, these fractional viewership values $p^s_{k,Dh}$ may include adjustments for the duration of the tuning event relative to the episode duration and other factors.

The data aggregation processor 206 aggregates the episode viewership data representing episodes of the same program in order to generate program viewership data (708). In some implementations, the desired statistic is how many viewers are estimated to have seen at least one episode of the program. In this case, the data aggregation processor 206 may use the fractional viewership data associated with each episode and individual in order to produce fractional values representing each individual having watched at least one episode of the program. For example, the fractional viewership values $v_1$ to $v_4$ for a single individual over four episodes may be used to produce a program viewership value $v_p$ representing the probability that the individual watched at least one episode of the program:

$$v_p = 1-(1-v_1)*(1-v_2)*(1-v_3)*(1-v_4)$$

In this way, each household member will contribute at most 1 viewer to the program viewership data.

Formally, for all episodes s of a program ṡ, the probability of each person i having viewed at least one episode s is:

$$P^{\dot{s}}_{i,D_h} = 1 - \prod_m \left[1 - p^{s_m}_{i,D_h}\right] \; \forall \, s_m \in \dot{s}$$

The de-duplicated number of persons who viewed the programs can be calculated by summing up these probabilities. The summation can also be conditioned on a demographic segment.

The data aggregation processor 206 may use similar methods to aggregate program viewership data over multiple programs in order to generate product network viewership data (710). For example, similar to the calculation above for program viewership data, for all programs ṡ on a network s̈, the probability of each person i having viewed one of the programs is:

$$p^{\ddot{s}}_{i,D_h} = 1 - \prod_n \left[1 - p^{\dot{s}_n}_{i,D_h}\right] \; \forall \, \dot{s}_n \in \ddot{s}$$

The de-duplicated number of persons who viewed a program on networks s can be calculated by summing up these probabilities. The summation can also be conditioned on a demographic segment.

The data aggregation processor 206 may similarly aggregate network viewership data over multiple commonly-owned networks in order to generate entity viewership data (712). For example, for all networks s̈ owned by a common entity e, the probability of each person i having viewed one of the networks s̈ is:

$$p^{e}_{i,D_h} = 1 - \prod_n \left[1 - p^{\ddot{s}_n}_{i,D_h}\right] \; \forall \, \ddot{s}_n \in e$$

The de-duplicated number of persons who viewed a network owned by entity e can be calculated by summing up these probabilities. The summation can also be conditioned on a demographic segment.

In some implementations, each step of the process may use one or more of the aggregation techniques described above, or others appropriate to allowing for overlap and other factors relevant to aggregation at that level.

Figure 8:
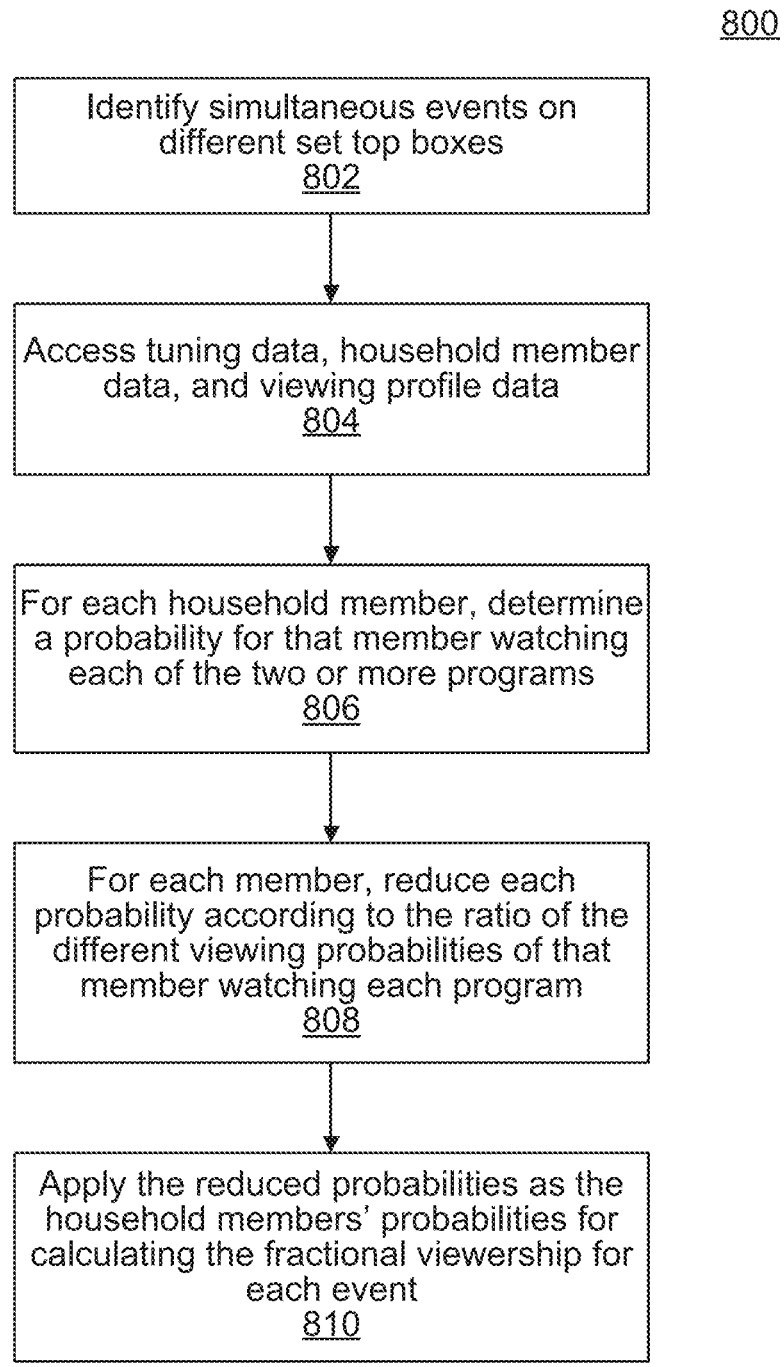
FIG. 8 is a flowchart illustrating an example of a process for assigning fractional viewership values for simultaneous television viewing events in a household.

FIG. 8 is a flowchart illustrating an example of a process 800 for assigning fractional viewership values for simultaneous television viewing events in a household. Because a household may have more than one set top box and more than one display device, at times there may be more than one program episode being viewed at a time by members of a household. In some implementations, the existence of more than one program episode being viewed at the same time in a household may affect the fractional values determined for members of that household for one or both of the viewing events.

In some implementations, steps of the process 800 may occur in conjunction with steps of the process 500 as described above. Whereas the process 500 is described in terms of a single tuning event, the process 800 involves identifying two or more tuning events for which data associated with each event will impact the fractional values determined for the other events. The process 800 can supplement process 500 when there is more than one tuning event.

The pre-processing module 204a identifies simultaneous events associated with the same household generated by set top boxes (802). In some implementations, simultaneous events are those that include at least some overlap in the times in which the events are shown. In some implementations, simultaneous events may have to have at least a threshold amount of overlap to be considered simultaneous; that is, nominal overlap between the first and last minutes of events that are primarily at different times may not be identified as simultaneous.

Although the process 800 is described as dealing with whole simultaneous events, in situations where only a portion of the events overlap, the system may deal with the overlapping portion of each event as one event and the non-overlapping portion as a different event, and apply the process 800 only to the overlapping portion of the two or more events.

The pre-processing module 204a accesses the tuning data 116, household member data 110, and viewing profile data 118 as described above with respect to each of the two or more simultaneous viewing events (804). In some implementations, action 804 may be carried out as described above with respect to the similar action 502 of the process 500, except that it is carried out for each of the two or more tuning events identified in action 802.

For each member, the measurement adjustment module 204c reduces each probability according to the ratio of the different viewing probabilities of that member watching each program (808). In some implementations, it is assumed that each household member watches at most one of the multiple simultaneous viewing events. In this case, the fractional viewership value for each event may be adjusted in proportion to the relative probability of the user watching the program associated with that event rather than a program associated with one of the other events. For example, assuming a given member is assigned an initial probability of $p_1$ and $p_2$ for watching programs associated with two simultaneous events, the equation for the split probability $sp_1$ may be:

$$sp_1 = p_1/(p_1+p_2)*p_1$$

Similarly, the equation for the split probability $sp_2$ may be:

$$sp_2 = p_2/(p_1+p_2)*p_2$$

The measurement adjustment module 204c uses these split probability values $sp_1$ and $sp_2$ in place of the initial probability values $p_1$ and $p_2$ when calculating the adjusted probability for fractional viewership (810). Without loss of generality, similar equations may be used to extend the adjustment to three or more simultaneous events, and the resulting split probability $sp_n$ may be used in place of the initial probability $p_n$ for each set top box involved in simultaneous viewing events. In some implementations, actions 504, 506, and 508 of the process 500 may proceed using the split probability values sp for each household member in calculating the household adjustment factor, the adjusted probabilities, and the fractional viewership values for each of the two or more tuning events identified in action 802.

Figure 9:
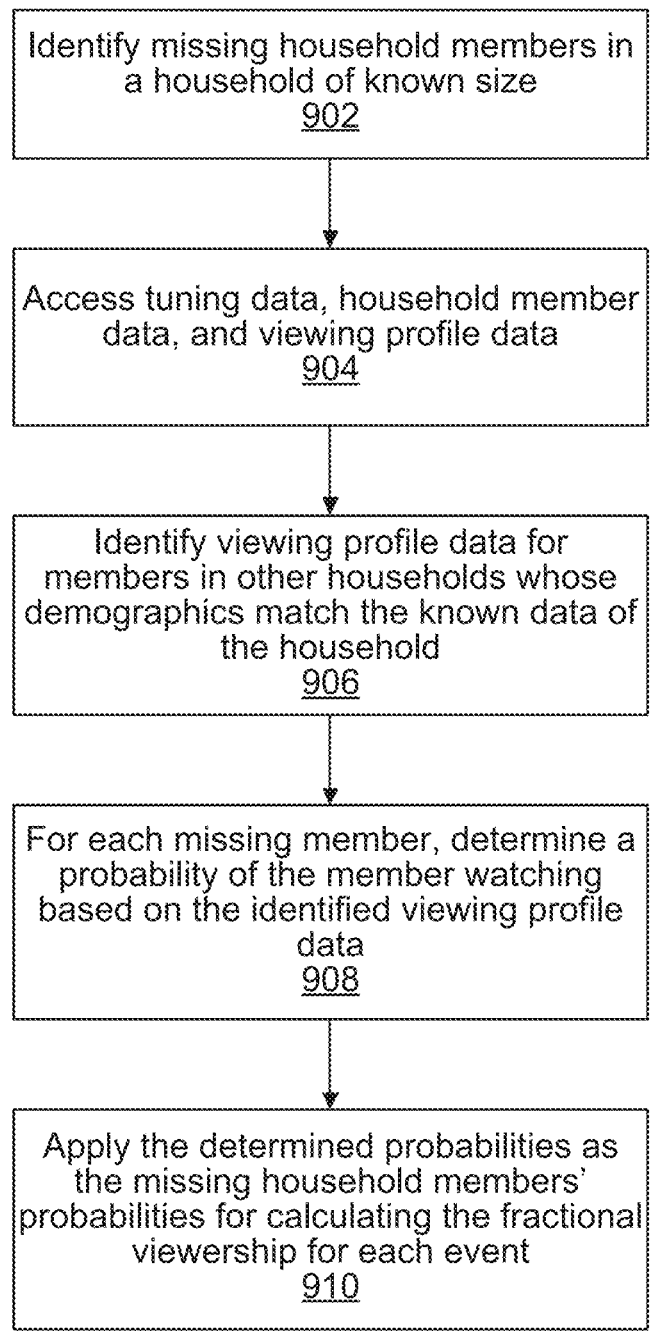
FIG. 9 is a flow chart illustrating an example process for assigning fractional viewership values in households when not all individual demographics are known.

FIG. 9 is a flow chart illustrating an example of a process 900 for assigning fractional viewership values in households when not all individual demographics are known.

The pre-processing module 204a identifies one or more missing household members in a house of known size (902). This situation may arise where survey data exists or is incomplete, such as where a household member has identified household size in a survey but one or more other members of the household has not been identified. It may also occur where members of a household are identified individually, but data usage patterns or other public information also identify the existence of other household members without disclosing individual information for the other household members. For example, the pre-processing module 204a may have data on three household members in what it knows to be a household of size four. It therefore identifies one household member whose demographics are not known.

The pre-processing module 204a accesses the tuning data 116, household member data 110, and viewing profile data 118 (904).

The pre-processing module 204a accesses viewing profile data for other households whose demographics match the known data of the particular household (906). For example, the pre-processing module 204a may identify that the particular household has a 24-year-old female member, a 35-year-old female member, and a 46-year old male member, plus one member whose demographics are unknown. The pre-processing module may access viewing profile data for all other households with four members that include a female 18-24, a female 35-44, and a male 45-54. The fourth member in those households may not always have the same demographic profile, but those fourth members form their own group with data that can be accessed and processed by the pre-processing module 204a.

For each missing member, the initial measurement module 204b determines a probability of the member watching the program based on the identified viewing profile data (908). In some implementations, this uses the viewing profiles of the household members corresponding to the missing member in the other households.

For example, a particular household has four members {24F, 35F, 46M, missing}. In order to determine a probability of the missing member watching a program associated with a given tuning event, the initial measurement module 204b may look at the viewing profile data for households having a female 18-24, a female 35-44, a male 45-54, and a fourth member. The viewing profiles of the fourth members in each of those households may be used to determine a probability for the missing member watching the show. For example, for a household with four members {19M, 21F, 42F, 50M}, the viewing profile of the 19-year-old male would be included. For a household with four members {18F, 30F, 44F, 45M}, the 30-year-old female would be included. For a household with four members {24F, 44F, 54M, 75M}, the 75-year-old male would be included. As above with respect to action 502 of the process 500, the probability of the missing member watching the program may be determined to be the proportion of these included members who watched the program.

The measurement adjustment module 204c applies the determined probabilities for the missing members for calculating fractional viewership for each event (910). That is, the process otherwise proceeds as described above with respect to actions 504, 506, and 508 of the process 500, with the determined probabilities being used for determining a household adjustment factor, adjusted probabilities, and fractional viewership values as described.

In some implementations, the missing members are not considered to be part of any particular demographic, and so any subsequent reports or viewership data using particular demographics may exclude the fractional viewership values determined for the missing members. However, in some implementations, the fractional viewership values may be included when generating reports not specific to the missing demographic data, such as general viewership statistics or reports broken down only by household size.

Applying the demographic attribution model as described above with respect to processes 300, 400, 500, 700, 800, and 900 generally assumes that viewing profile data 118, representing the demographics of household members and whether or not they watch a particular program, is known for the program associated with the event for which event viewership data is to be determined. More formally, as described above with respect to action 502 of process 500, in determining $P(V_i^s|d_i, H)$, the probability that a particular household member i watched the episode s given the member's demographic information $d_i$ and household size H, the following equation is used:

$$P(V_i^s \mid d_i, H) = \frac{n_{d_i,H}}{N_{d_i,H}}$$

Where $n_{di,H}$ is the number of persons with demographic characteristics $d_i$ and household size H within the viewing profile data 118 who are recorded as watching a particular episode of the program, and $N_{di,H}$ is the total number individuals with demographic characteristics $d_i$ and household size H within the profile viewing data 118.

In some implementations, the data score 120 may not include adequate viewing profile data 118 for a particular program. Formally, the variable $n_{di,H}$ from the above equation is not available, and so the above equation cannot be used to determine $P(V_i^s-d_i, H)$. However, other techniques may be available for determining the probabilities of each household member watching the program. For example, the data store 120 may include viewership data for the network n and viewership data for a particular time of viewing, δ (such as between 8 pm and 8:30 pm). Formally, the data store 120 may include data sufficient to determine $P(V_i^n|d_i, H)$, the probability that a particular household member i watches the network n, and $P(V_i^δ|d_i, H)$, the probability that a particular household member i watches television at time 6.

In some implementations, the following equation can be applied:

$$P(V_i^s|d_i,H)=P(V_i^n|d_i,H) \times P(V_i^δ|d_i,H)$$

Given a household member's demographics and household size, this equation determines the probability of an individual i watching an episode s for which program viewership data as a product of the probability that the individual watches the network n multiplied by the probability that the individual watches television during the particular time of viewing associated with the episode is not available. This equation provides a method to determine the probabilities necessary to carry out, for example, action 502 of process 500, action 806 of process 800, or action 908 of process 900. Similar alternatives may be available in order to accommodate other missing data as necessary.

Although specific examples using various equations of probability are described herein, the methods described herein can be used with a variety of probability and statistical techniques and are not limited to only the equations and examples shown.

Systems for Implementation

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

What is claimed is:

1. A computer-implemented method comprising:
    determining a household adjustment factor for a particular household including individual members, the household adjustment factor representing a probability that one or more of the individual members of the particular household watched a viewing event associated with the particular household;
    determining fractional viewership values for the individual members of the particular household based at least in part on household member data representing information regarding the individual members of the particular household, viewing profile data representing information on members of other households regarding viewership by the individual members of the other households, and the household adjustment factor; and
    determining household viewership data for the particular household based on the fractional viewership values.

2. The method of claim 1, wherein the viewing profile data is based on survey data.

3. The method of claim 1, wherein determining fractional viewership values for the individual members of the particular household comprises, for at least one of the individual members:
    determining that a particular episode of a program is associated with the viewing event; and
    determining a fraction of members of other households including members with information matching the individual member that watch the program.

4. The method of claim 3,
    wherein the household member data does not include information on at least one missing member of the particular household;
    wherein the method further comprises determining a fractional viewership value for the at least one missing member based on determining a fraction of identified members of other households that watch the program, wherein the at least one member is identified based on the other members in their households having information matching the information of the members of the particular household other than the at least one missing member.

5. The method of claim 3, further comprising:
    accessing the household viewership data;
    accessing other household viewership data for one or more other viewing events associated with the particular episode of the program; and
    aggregating the household viewership data and the other household viewership data to generate episode viewership data associated with the particular episode of the program.

6. The method of claim 5, further comprising:
    accessing the episode viewership data associated with the particular episode of the program;
    accessing other episode viewership data for one or more other episodes of the program; and
    aggregating the episode viewership data and the other episode viewership data to generate program viewership data associated with the program.

7. The method of claim 6, further comprising:
    accessing the program viewership data, wherein the program is associated with a particular content source;
    accessing other program viewership data for one or more other programs each associated with the particular content source; and
    aggregating the program viewership data and the other program viewership data to generate network viewership data associated with the particular content source.

8. The method of claim 7, further comprising:
    accessing the network viewership data, wherein the particular content source is associated with a particular entity;
    accessing other network viewership data for one or more other content sources each associated with the entity; and
    aggregating the network viewership data and the other network viewership data to generate entity viewership data associated with the entity.

9. The method of claim 1, wherein:
    the viewing event is included in tuning data further including a time, date, and content source for the viewing event; and determining fractional viewership values for the individual members of the particular household comprises, for at least one of the individual members, determining a fraction of members of other households with information matching the individual member that watch the content source at the time and date associated with the viewing event.

10. The method of claim 1, wherein the household member data includes, for each of the individual members, one or more demographic groups to which that member belongs.

11. The method of claim 1, further comprising:
accessing tuning data representing a second viewing event associated with the particular household and a particular episode of a second program, the second viewing event occurring simultaneously with the viewing event; and
accessing second program viewership data representing information on individual members of other households regarding viewership of the second program by the individual members of the other households;
wherein determining fractional viewership values for the individual members of the particular household is further based on the second program viewership data.

12. A system comprising:
memory for storing data; and
one or more processors operable to perform operations comprising:
determining a household adjustment factor for a particular household including individual members, the household adjustment factor representing a probability that one or more of the individual members of the particular household watched a viewing event associated with the particular household;
determining fractional viewership values for the individual members of the particular household based at least in part on household member data representing information regarding the individual members of the particular household, viewing profile data representing information on members of other households regarding viewership by the individual members of the other households, and the household adjustment factor; and
determining household viewership data for the particular household based on the fractional viewership values.

13. The system of claim 12, wherein the viewing profile data is based on survey data.

14. The system of claim 12, wherein determining fractional viewership values for the individual members of the particular household comprises, for at least one of the individual members:
determining that a particular episode of a program is associated with the viewing event; and
determining a fraction of members of other households including members with information matching the individual member that watch the program.

15. The system of claim 14,
wherein the household member data does not include information on at least one missing member of the particular household;
wherein the operations further comprise determining a fractional viewership value for the at least one missing member based on determining a fraction of identified members of other households that watch the program, wherein the at least one member is identified based on the other members in their households having information matching the information of the members of the particular household other than the at least one missing member.

16. The system of claim 14, the operations further comprising:
accessing the household viewership data;
accessing other household viewership data for one or more other viewing events associated with the particular episode of the program; and
aggregating the household viewership data and the other household viewership data to generate episode viewership data associated with the particular episode of the program.

17. The system of claim 16, the operations further comprising:
accessing the episode viewership data associated with the particular episode of the program;
accessing other episode viewership data for one or more other episodes of the program; and
aggregating the episode viewership data and the other episode viewership data to generate program viewership data associated with the program.

18. The system of claim 17, the operations further comprising:
accessing the program viewership data, wherein the program is associated with a particular content source;
accessing other program viewership data for one or more other programs each associated with the particular content source; and
aggregating the program viewership data and the other program viewership data to generate source viewership data associated with the particular content source.

19. The system of claim 18, the operations further comprising:
accessing the network viewership data, wherein the particular content source is associated with a particular entity;
accessing other network viewership data for one or more other content sources each associated with the entity; and
aggregating the network viewership data and the other network viewership data to generate entity viewership data associated with the entity.

20. A non-transitory, computer-readable medium storing instructions operable when executed to cause at least one processor to perform operations comprising:
determining a household adjustment factor for a particular household including individual members, the household adjustment factor representing a probability that one or more of the individual members of the particular household watched a viewing event associated with the particular household;
determining fractional viewership values for the individual members of the particular household based at least in part on household member data representing information regarding the individual members of the particular household, viewing profile data representing information on members of other households regarding viewership by the individual members of the other households, and the household adjustment factor; and
determining household viewership data for the particular household based on the fractional viewership values.

21. The method of claim 1, wherein the household adjustment factor is determined based on viewing data for other households that share at least one demographic attribute with the particular household.

* * * * *